(12) United States Patent
Mizutani et al.

(10) Patent No.: US 10,306,095 B2
(45) Date of Patent: May 28, 2019

(54) IMAGE PROCESSING APPARATUS AND METHOD

(71) Applicants: KABUSHIKI KAISHA TOSHIBA, Tokyo (JP); TOSHIBA TEC KABUSHIKI KAISHA, Tokyo (JP)

(72) Inventors: Akihiro Mizutani, Mishima Shizuoka (JP); Hiroshi Watanabe, Yokohama Kanagawa (JP); Toshihiro Ida, Mishima Shizuoka (JP); Kazuhiro Ogura, Hiratsuka Kanagawa (JP); Takahiro Hagiwara, Chiba Chiba (JP); Kazuhiro Kamimura, Mishima Shizuoka (JP); Yusuke Hamada, Mishima Shizuoka (JP); Koji Endo, Sunto Shizuoka (JP); Yoshinori Sato, Mishima Shizuoka (JP); Sho Sakuma, Mishima Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/922,570

(22) Filed: Mar. 15, 2018

(65) Prior Publication Data

US 2019/0028603 A1    Jan. 24, 2019

(30) Foreign Application Priority Data

Jul. 24, 2017    (JP) .................................. 2017-143005

(51) Int. Cl.
*G06F 3/12* (2006.01)
*H04N 1/32* (2006.01)
(Continued)

(52) U.S. Cl.
CPC ..... *H04N 1/32101* (2013.01); *G06F 16/5846* (2019.01); *H04N 1/00336* (2013.01);
(Continued)

(58) Field of Classification Search
CPC ........... H04N 1/32101; H04N 1/00336; H04N 2201/3249; H04N 2201/0094; G06F 17/30253
(Continued)

(56) References Cited

U.S. PATENT DOCUMENTS

2011/0292432 A1*  12/2011  Matsusaka ......... H04N 1/00352
                                                            358/1.14

FOREIGN PATENT DOCUMENTS

JP    2009141772 A    6/2009
JP     4802691 B2    10/2011
JP    2014153877 A    8/2014

OTHER PUBLICATIONS

Shirai; JP 2009-141772; 2009; Canon, all translated pages (Year: 2009).*

* cited by examiner

*Primary Examiner* — Neil R McLean
(74) *Attorney, Agent, or Firm* — Kim & Stewart LLP (57) ABSTRACT

An image printing apparatus includes a control section configured to receive original image data, analyze the original image data to acquire address information included in the original image data, and generate a two-dimensional code corresponding to the acquired address information. A printer is then controlled to print the generated two-dimensional code and the original image data.

20 Claims, 7 Drawing Sheets

(51) Int. Cl.
*H04N 1/00* (2006.01)
*G06F 16/583* (2019.01)

(52) U.S. Cl.
CPC ............... *H04N 2201/0094* (2013.01); *H04N 2201/3249* (2013.01)

(58) Field of Classification Search
USPC ...................................................... 358/1.15
See application file for complete search history.

FIG. 7

IMAGE PROCESSING APPARATUS AND METHOD

CROSS-REFERENCE TO RELATED APPLICATION

This application is based upon and claims the benefit of priority from Japanese Patent Application no. 2017-143005, filed Jul. 24, 2017, the entire contents of which are incorporated herein by reference.

FIELD

Embodiments described herein relate generally to an image processing apparatus, and a method.

BACKGROUND

Sometimes an image is printed including address information, such as an e-mail address and a URL (Uniform Resource Locator). In such cases, it may be necessary for a viewer/user of the printed address information to manually input this address information into an electronic device, such as a personal computer or a smart phone. Such manual inputting of address information is troublesome and there is always the possibility that the address information will be incorrectly input.

DETAILED DESCRIPTION

In one embodiment, an image printing apparatus includes a control section configured to: receive original image data, analyze the original image data to acquire address information included in the original image data, and generate a two-dimensional code corresponding to the acquired address information. A printer is controlled to print the generated two-dimensional code and the original image data.

Figure 1:
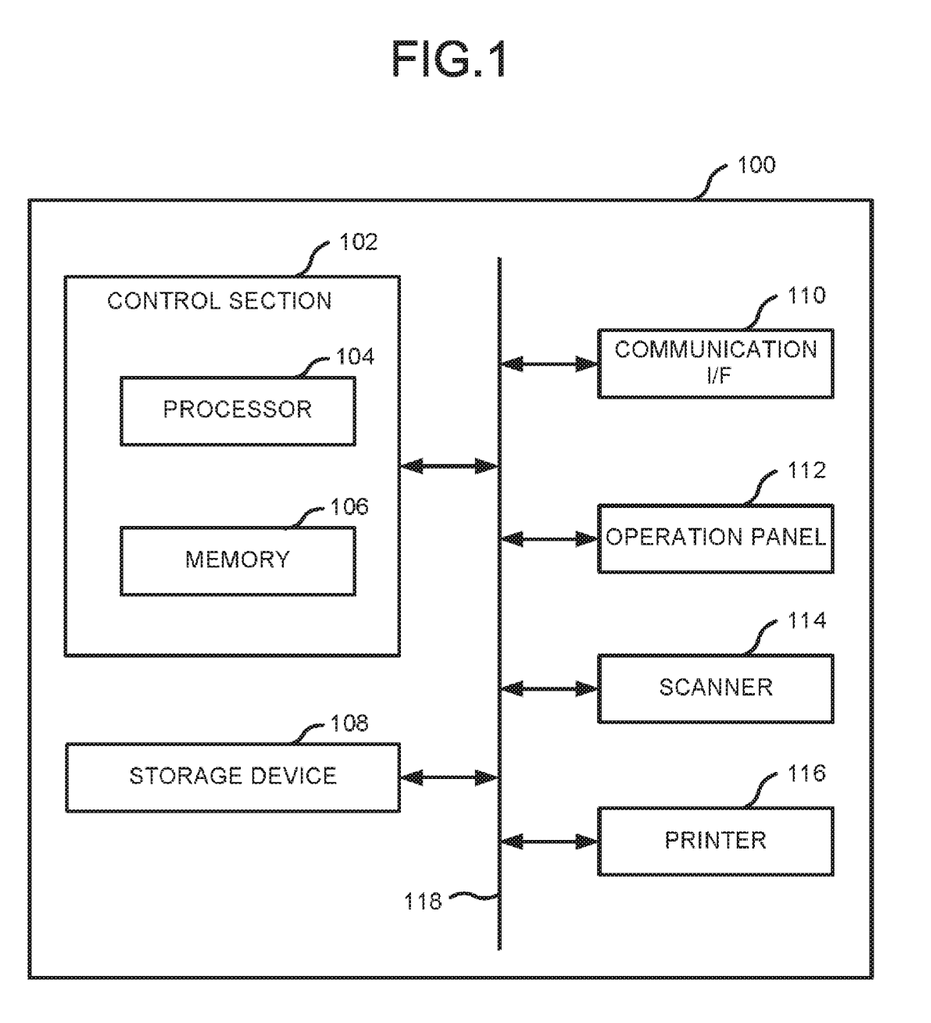
FIG. 1 depicts an image processing apparatus according to an embodiment.

FIG. 1 is a diagram illustrating aspects of an image processing apparatus 100. The image processing apparatus 100 includes a control section 102, a storage device 108, and a communication I/F 110. The image processing apparatus 100 includes an operation panel 112, a scanner 114, and a printer 116 for printing an image. Each component of the image processing apparatus 100 is connected via a bus line 118.

The control section 102 includes a processor 104, such as a CPU (Central Processing Unit) or a MPU (Micro Processing Unit), and a memory 106. The memory 106 includes a ROM (Read Only Memory) and a RAM (Random Access Memory). A control program is stored in the ROM. The RAM provides a temporary working area for the processor 104.

The control section 102 controls each sub-section of the image processing apparatus 100 on the basis of programs stored in the ROM or the storage device 108. For example, the control section 102 provides control for the operation panel 112, the scanner 114, and the printer 116. The control section 102 also provides image processing functions for correcting or expanding image data.

The storage device 108 stores an application program and an OS (Operating System). The application program includes program instructions for providing various functions of the image processing apparatus 100, such as, for example, a copy function, a print function, a scanner function, a facsimile function, and a network file function. The application program includes a Web browser, or other application for Web client functions and the like.

There is an address acquisition program and a two-dimensional code generation program. In a case in which address information is included in image data stored in the storage device 108, the address acquisition program acquires this address information. Specifically, the address acquisition program carries out a character recognition processing on the image data. The address acquisition program acquires the address information by the character recognition processing on text in the image data. The address information according to the present embodiment can be a mail address, a URL (Uniform Resource Locator), or a telephone number. The address information may be other information of a similar nature.

The two-dimensional code generation program generates a two-dimensional code corresponding to the address information acquired by the address acquisition program. The generated two-dimensional code is subsequently stored in the storage device 108. The printer 116 prints the image according to the image data and adds the two-dimensional code to the printed sheet.

The storage device 108 is at least one or more of a magnetic storage device, an optical storage device, and a semiconductor storage device. The storage device 108 temporarily stores image data acquired from a document read by the scanner 114 or image data acquired via the communication I/F 110. The storage device 108 stores software updates, protected electronic documents, text data, account information, and policy information as necessary.

A page size of a particular sheet onto which the image data is to be printed is predetermined. For example, in the image data of a document read by the scanner 114, the same page size as the size of the read document is selected as the page size for printing. For the image data acquired via the communication I/F 110, the page size is designated by the image data source, such as the PC that transmits the image data. Furthermore, in a case in which the page size is changed from a predetermined size, the page size can be reset to another predetermined page size.

The communication I/F 110 is an interface for connecting with an external device. The communication I/F 110 is connected to an external device in wireless or wired manner. As a wireless or wired standard, for example, Bluetooth®), IEEE 802.15, IEEE 802.11, IEEE 802.3, IEEE 1284 and the like are exemplified. The communication I/F 110 may include a USB connection section, permitting a connection terminal corresponding to a USB standard to be connected, and/or a parallel interface. The control section 102 communicates with a user terminal, a USB device, or other external devices via the communication I/F 110.

If the image processing apparatus 100 prints an image and a two-dimensional code for address information included in the image, as indicated by the image data, then the user can select a printing method for the image and the two-dimensional code from three types of printing methods. In general, it is assumed here that the page size is predetermined for the image, as described above.

The first printing method, also referred to as a "reduction printing method," is a method for printing a reduced-size image and the two-dimensional code on one sheet of the predetermined page size. For example, in a case in which the page size of the image is A4, the reduced-size image and the two-dimensional code are printed on one sheet of A4 sized paper. Here, the printed size of the reduced-size image is varied depending on the number of two-dimensional codes to be printed along with the image. Specifically, the greater the number of the two-dimensional codes to be printed, the smaller the printed size of the image will be on the printed sheet.

The second printing method, also referred to as a "large sheet printing method, is a method for printing an image having an original image page size of predetermined size on one that has a page size that is larger than the original image page size and printing a two-dimensional code in the margin of the printed sheet. For example, in a case in which the original image page size is A4, the image can be printed on a sheet having an A3 page size, that is larger than an A4 page size sheet, and the two-dimensional code is printed in the margin of the A3 sized sheet. Herein, "margin" refers to an area outside an area corresponding to the nominal page size of the image. Thus, whatever image-type the image may be (for example, a picture drawn to fill an entire A4 sheet edge-to-edge), the two-dimensional code and the image are still not overlapped on the final printed sheet.

If the two-dimensional code is printed at a position which is not within the margin, then user cannot determine whether or not the two-dimensional code was included in the original image. In general, it is not preferable to print the two-dimensional code in a non-margin area (that is, within the nominal printing area of the original image) because the two-dimensional code did not exist in the original image.

Figure 2:
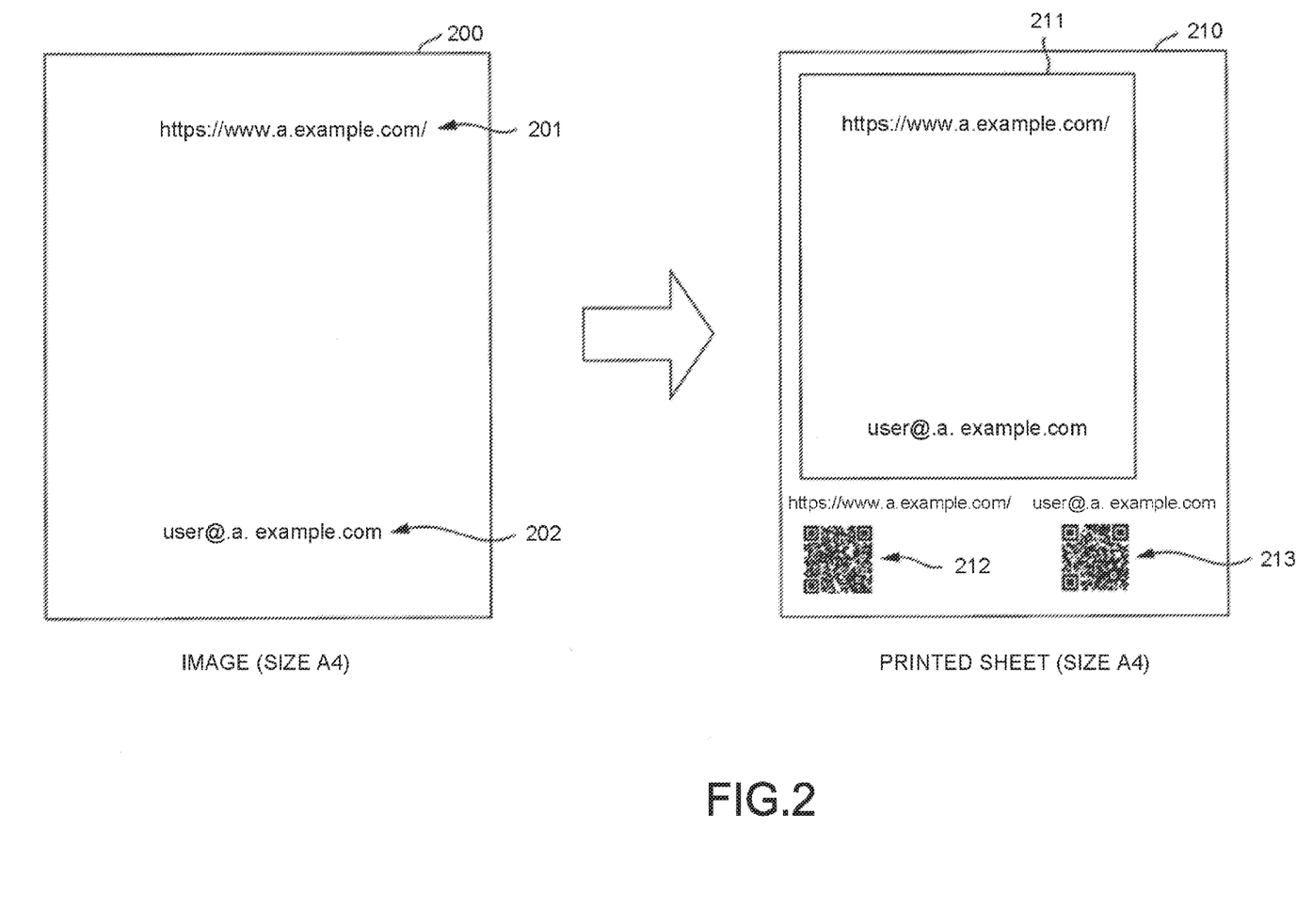
FIG. 2 depicts an example of printing by a reduction printing method.
Figure 3:
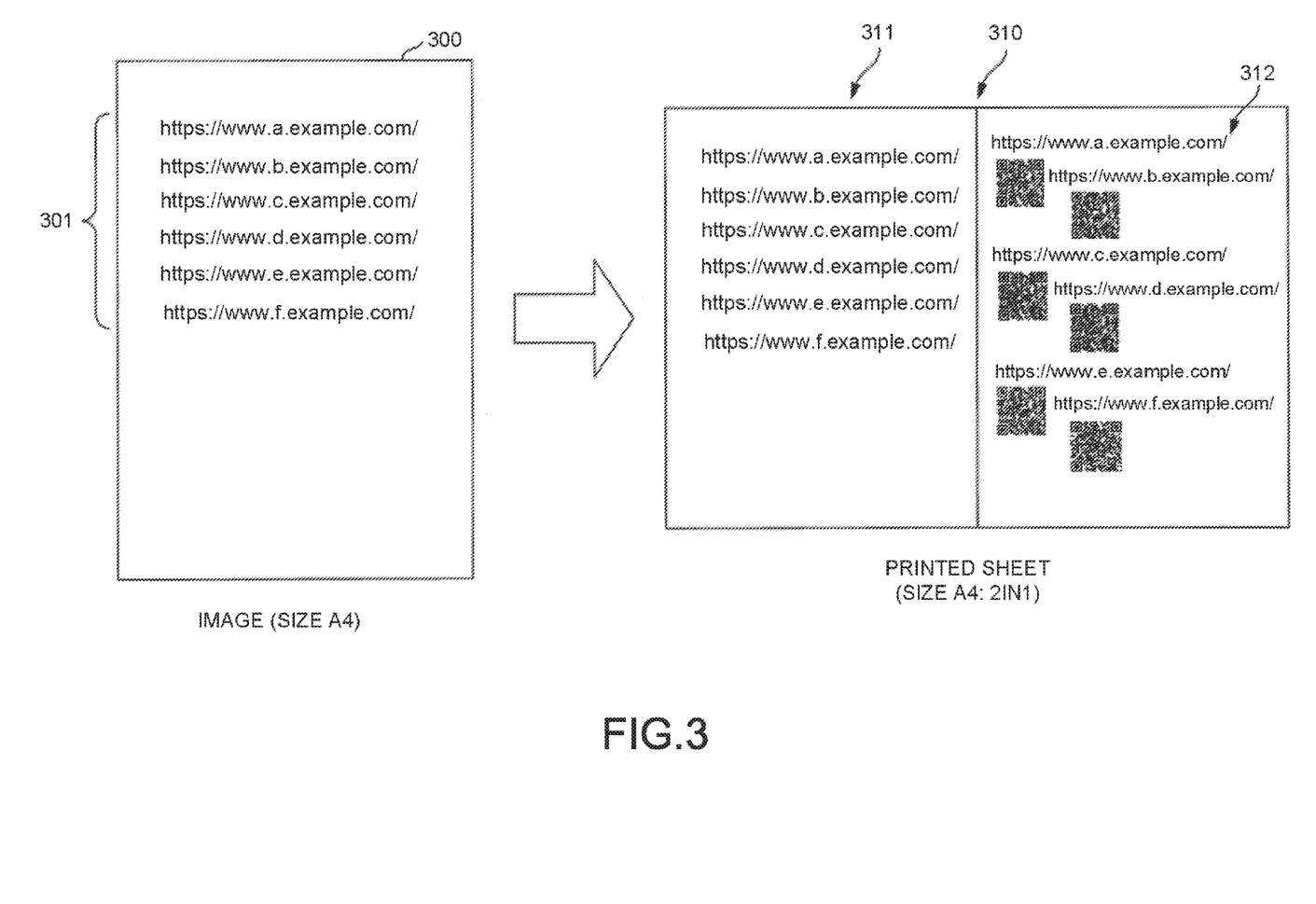
FIG. 3 depicts another example of printing by the reduction printing method.

The third printing method, also referred to as an "another sheet printing method, is a method for printing the two-dimensional code on a different sheet from the sheet on which the image is printed. In this case, the image is printed on the sheet having a predetermined page size and the two-dimensional code is printed on another sheet having the same or different page size as the sheet on which the image is printed. FIG. 2 and FIG. 3 are diagrams illustrating examples of the reduction printing method. In FIG. 2, an image 200 with a page size A4 and a printed sheet 210 of A4 size are shown. Two addresses (address information 201 and address information 202) are included in the image 200. The address information 201 indicates a URL, and the address information 202 indicates an electronic mail address. The address acquisition program acquires the two addresses from the image data. The two-dimensional code generation program generates two-dimensional codes for the two addresses.

The printer 116 prints the image 211 and two-dimensional codes 212 and 213 to provide the printed sheet 210. The two-dimensional code 212 is a two-dimensional code corresponding to the address information 201. The two-dimensional code 213 is a two-dimensional code corresponding to the address information 202. The corresponding address information is printed in text characters next to each of the two-dimensional codes 212 and 213 in order to indicate which address information goes with each the two-dimensional codes 212 and 213. In this way, the user can distinguish the two-dimensional codes from one another and match the codes to the corresponding to address information.

The user can subsequently capture either or both of the two-dimensional codes 212 and 213 with a camera in or attached to an electronic device, such as a smart phone and a PC. By capturing a two-dimensional code, the user can easily input the corresponding address information into the electronic device.

In the reduction printing method described above, the user can obtain the printed image and any two-dimensional codes on a single sheet having a page size that matches the page size of the original image data.

FIG. 3 is a diagram illustrating another example of the reduction printing method. A point difference from the example depicted in FIG. 2 is that there is much more address information provided in the image data (e.g., six vs. two). In FIG. 3, an image 300 of a page size A4 and a printed sheet 310 of A4 size are shown. Here, six addresses (in a region 301) are included in the image 300. Each of the six addresses is a different URL. The address acquisition program acquires the six addresses. The two-dimensional code generation program generates two-dimensional codes corresponding to the six addresses.

The printer 116 prints the image 311 and each of the two-dimensional codes 312 to provide the printed sheet 310. Since there is so much address information, as compared with the image 211 in FIG. 2, the image 311 must be further reduced. The image 311 and the two-dimensional codes 312 are printed at "2in1" sizing serving as a method for printing two pages worth of information on one sheet. In a case in which there is still more address information, the image 311 and the two-dimensional codes 312 can printed with "4in1" sizing serving as a method for printing four pages worth of information on one sheet. Even in a case in which the image 311 and the two-dimensional codes 312 are printed with "2in1" sizing, the address information is printed in text characters near the respective two-dimensional code in order to indicating which address information corresponds to which two-dimensional code. In this way, the user can distinguish the two-dimensional codes using the text characters.

In this way, by printing the two-dimensional codes corresponding to the address information in the image data, the user can capture the two-dimensional codes by a camera of an electronic device, such as a smart phone or a PC. By capturing the two-dimensional codes, the user can more easily input the address information into the electronic device.

In the reduction printing method described above, although the image is reduced, the user can obtain the image and the two-dimensional codes on a single sheet having the same page size as the original image data.

Figure 4:
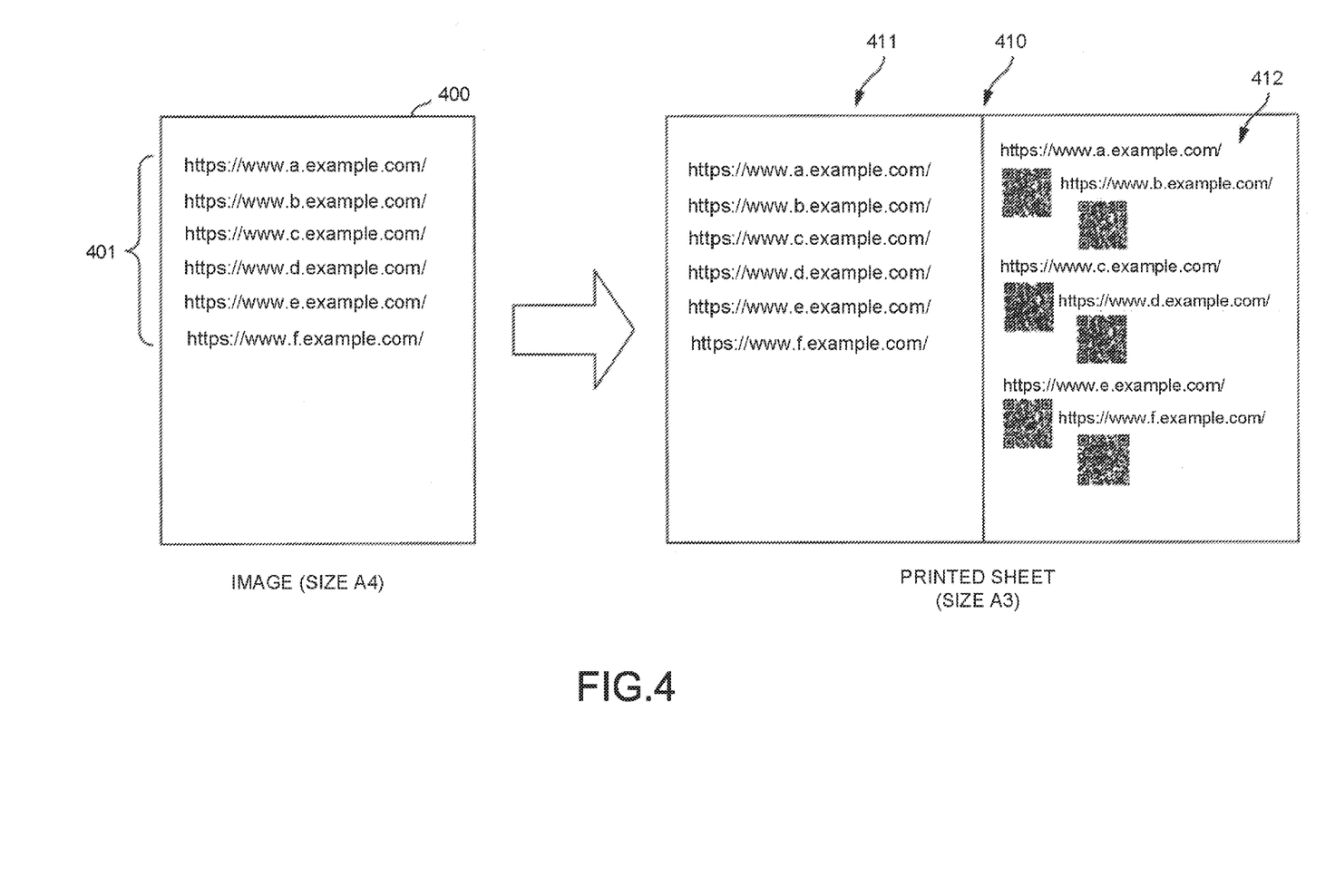
FIG. 4 depicts a large sheet printing method.

FIG. 4 is a diagram illustrating an example of printing by the large sheet printing method. In FIG. 4, an image 400 with a page size A4 and a printed sheet 410 of page size A3 are shown. There are size addresses (in region 401) included in the image 400. Each of the six addresses is a URL. The address acquisition program acquires these six addresses. The two-dimensional code generation program generates two-dimensional codes corresponding to these six addresses.

The printer 116 prints the image 411 and two-dimensional codes 412 to provide the printed sheet 410. There is a relatively large number of addresses; however, since the image 411 is being printed at A4 size it covers one half of a sheet that is A3 size. Furthermore, size of the printed image 411 substantially matches the page size of the original image data in this case. The corresponding address information is printed as text near each of the two-dimensional codes in order to indicating which address information matches which two-dimensional code. In this way, the user can distinguish the various two-dimensional codes from each other.

In this way, the user can capture the two-dimensional codes by a camera in an electronic device, such as a smart phone or a PC. By capturing the two-dimensional codes, the user can more easily input the address information into the electronic device.

In the large sheet printing method described above, it is possible to print the two-dimensional codes in a relatively larger size as compared to the reduction printing method. Thus, compared with the reduction printing method, it is possible to reduce resolution requirements of the camera to be used for capturing the code for input purposes.

Figure 5:
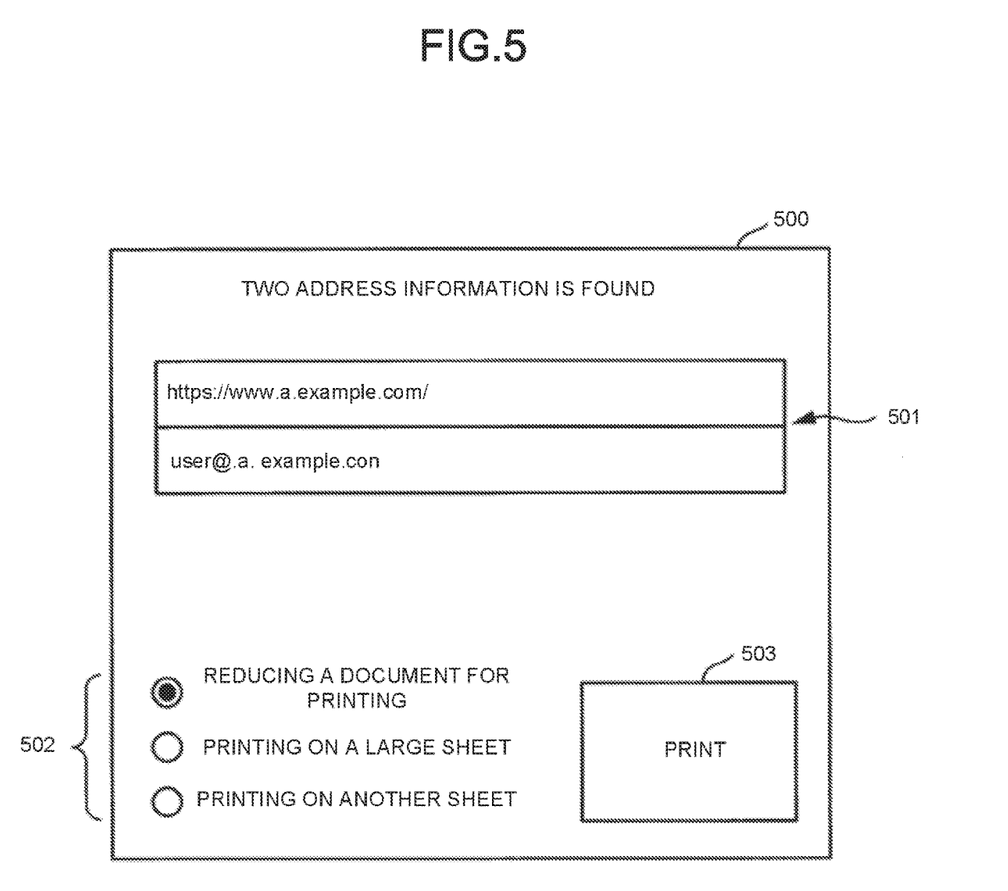
FIG. 5 depicts an address screen.

Next, aspects related to amendment of the address information is described. As described above, the address acquisition program acquires the address information through character recognition. In such a case, it is possible to misrecognize characters. FIG. 5 is a diagram illustrating an address verification screen to be displayed on the operation panel 112. This address verification screen is displayed after a document has been read by the scanner 114 and the address information has been acquired by the address acquisition program.

An acquisition address information column 501, a printing method radio button 502, and a print button 503 are included on the address screen 500. In the acquisition address information column 501, the address information that has been acquired by the address acquisition program is displayed in a text box or text boxes. Since two addresses have been acquired in this particular example, the two acquired addresses are displayed. Among these two addresses one is listed as "user@a.example.con" in the information column 501. As such, an address as acquired has an apparent error in it. Here, the last "m" in "user@a.example.com" has been misrecognized as "n." In this case, the user can edit "n" to "m" through use of a keyboard or a software keyboard included in the operation panel 112 or the like.

The printing method radio button 502 is a radio button for the user to select a printing method from among the reduction printing method, the large sheet printing method, and the another sheet printing method. The "reducing a document for printing" label in FIG. 5 corresponds to the reduction printing method. The "printing on a large sheet" corresponds to the large sheet printing method. The "printing on another sheet" corresponds to the another sheet printing method. Furthermore, it is possible that the user may not select any of these printing methods, and in this case, no two-dimensional code would be printed on the output printed sheet or sheets.

The user can obtain a printed sheet printed using the designated printing method, after carrying out the editing of the address information as needed, by touching the print button 503.

Figure 6:
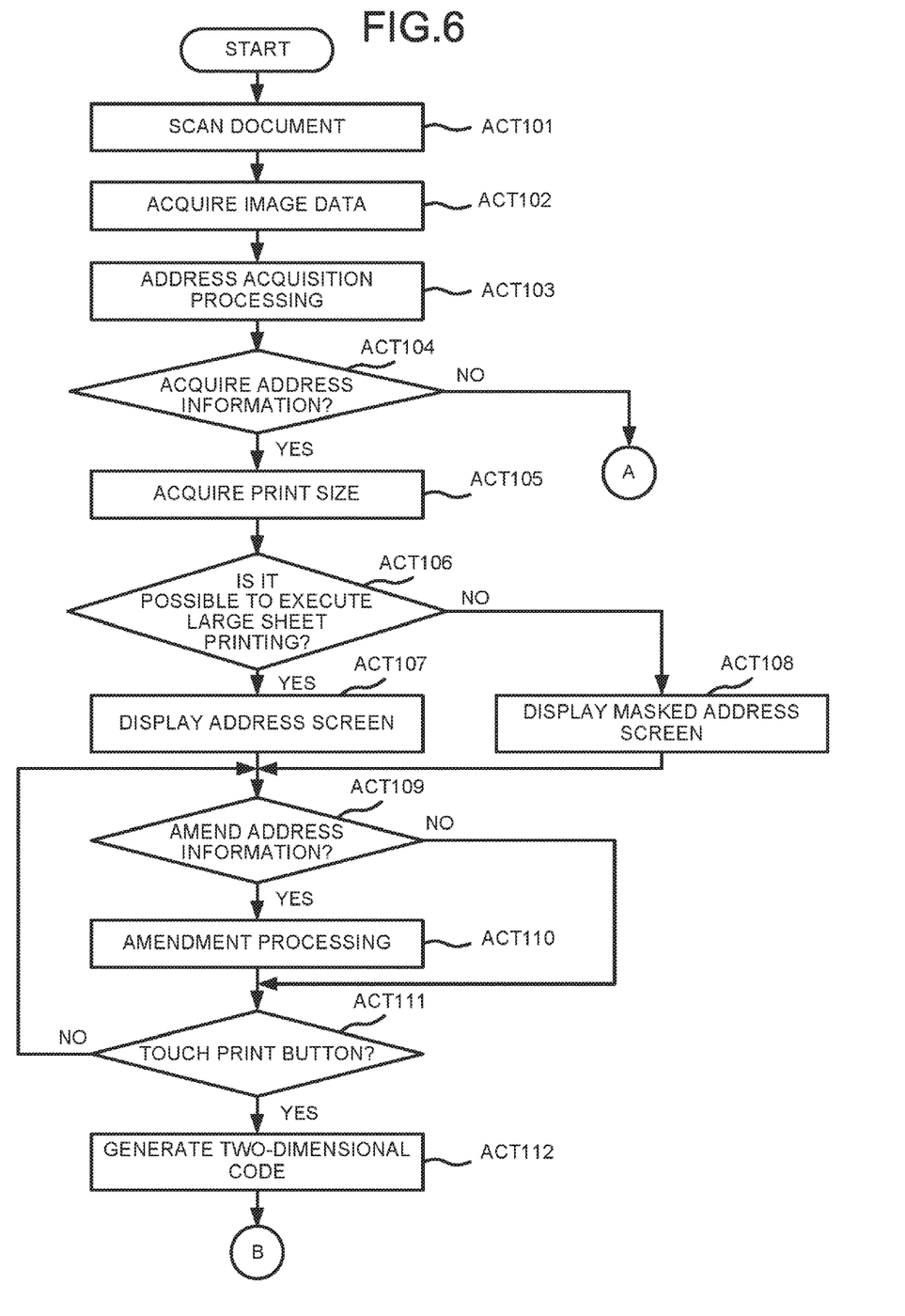
FIG. 6 is a flowchart illustrating aspects of a processing flow of the image processing apparatus.
Figure 7:
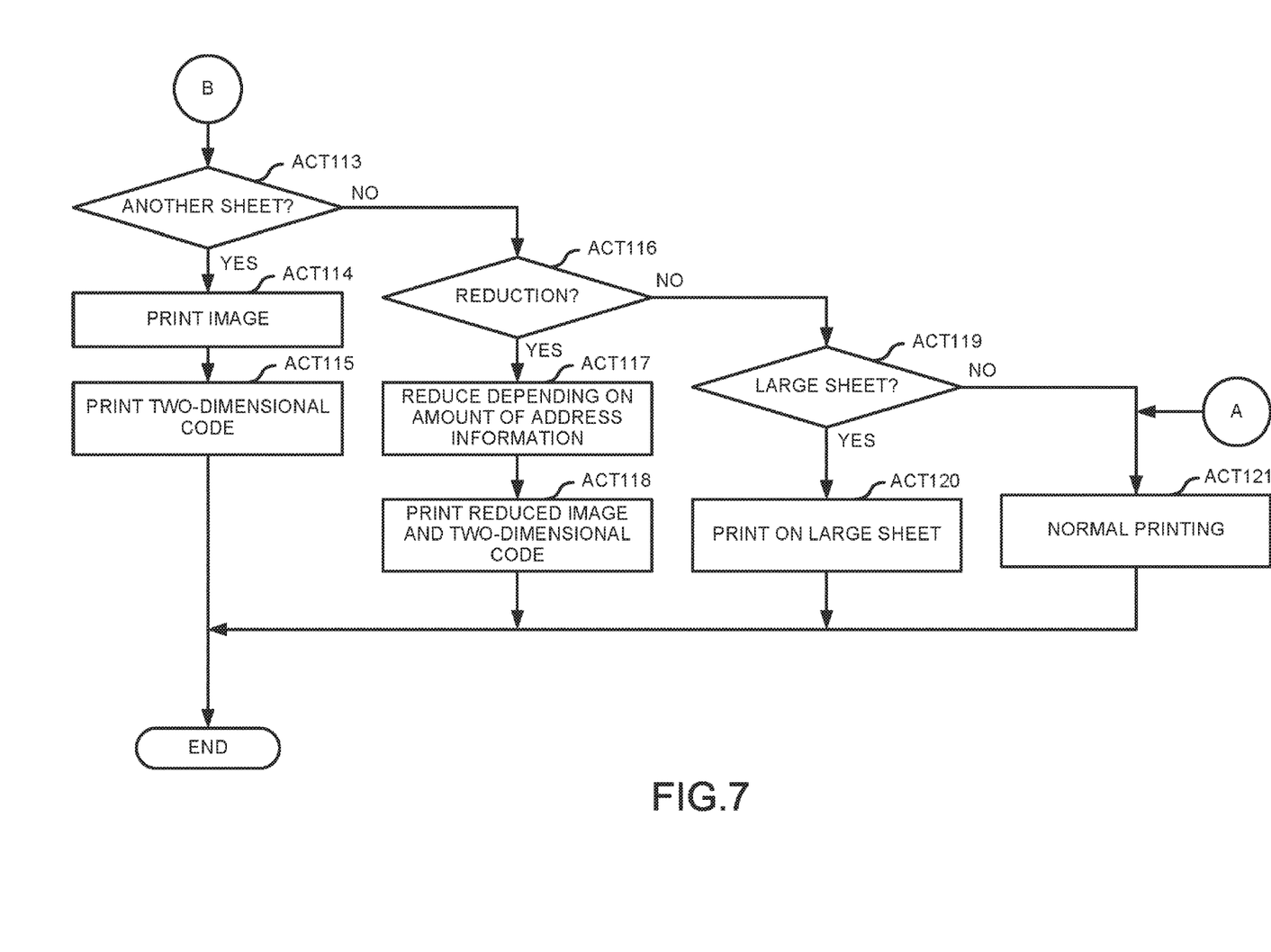
FIG. 7 is a flowchart illustrating aspects of a processing flow of the image processing apparatus.

FIG. 6 and FIG. 7 are flowcharts illustrating aspect of the processing of the image processing apparatus. These flowcharts in FIG. 6 and FIG. 7 indicate the processing for a case of printing a two-dimensional code on an output sheet by reading an original document (with at least one address in it) with the scanner 114 and then printing out an image of the scanned document along with the two-dimensional code corresponding to the address in the original document.

In ACT 101, a document is scanned by scanner 114. In ACT 102, the control section 102 acquires the image data corresponding to the document scanned in ACT 101. The control section 102 carries out an address acquisition processing using the address acquisition program (ACT 103). The control section 102 determines whether or not any address information has been acquired through the address acquisition processing (ACT 104).

If the address information is not acquired (NO in ACT 104), the control section 102 carries out a normal printing process in a processing in ACT 121 (see FIG. 7) and then ends the present processing. Here, a normal printing process refers to processing for only printing the scanned document image without printing a two-dimensional code. If the address information is acquired (YES in ACT 104), the control section 102 acquires a print size (ACT 105). The control section 102 determines whether or not the large sheet printing method can be executed (ACT 106). For example, in a case in which the maximum page size the image processing apparatus 100 can print is A3 and the print size for the image data is A3, the image processing apparatus 100 cannot execute the large sheet printing method because no larger size sheet is available. Thus, the determination in ACT 106 described above is carried out.

If the large sheet printing method can be executed (YES in ACT 106), the control section 102 displays the address screen on the operation panel 112 (ACT 107). On the other hand, if the large sheet printing method cannot be executed (NO in ACT 106), the control section 102 displays a masked address screen on the operation panel 112 (ACT 108). The masked address screen is an address screen in which the "printing with a large sheet" cannot be selected by the user.

The control section 102 determines whether or not the address information has been amended by the user (ACT 109) in the address screen. The "amended" refers to, for example, an operation carried out by the user on the operation panel 112 such deleting a character, adding a character, other editing the like. If the address information is amended by the user (YES in ACT 109), the control section 102 carries out an amendment processing (ACT 110), and proceeds to a processing in ACT 111. The amendment processing refers to, for example, a processing corresponding to an operation carried out by the user, such editing the as-acquired address information in the operation panel 112. If the address information is not amended by the user (NO in ACT 109), the control section 102 proceeds to a processing in ACT 111.

The control section 102 determines whether or not the print button 503 has been touched by the user (ACT 111). If the print button 503 is not touched (NO in ACT 111), the control section 102 returns to the processing in ACT 109 described above. If the print button 503 is touched (YES in ACT 111), the control section 102 generates a two-dimensional code by using the two-dimensional code generation program for each acquired address (ACT 112).

Next, as shown in FIG. 7, the processing is branched according to the printing method selected by the user. The control section 102 determines whether or not the "another sheet" printing method is selected by the user (ACT 113). If the "another sheet" printing method is selected (YES in ACT 113), the control section 102 prints the image at its predetermined print size (ACT 114). Next, the control section 102 prints the two-dimensional code(s) on a different sheet (ACT 115), and ends the present processing.

If the "another sheet" printing method is not selected (NO in ACT 113), the control section 102 determines whether or not the reduction printing method is selected by the user (ACT 116). If the reduction printing method is selected (YES in ACT 116), the control section 102 reduces the image by an amount depending on the amount of the address information (ACT 117). Next, the control section 102 prints a reduced size image along with the two-dimensional code (s) on a single sheet having the print size of the original image data (ACT 118), and ends the present processing.

If the reduction printing method is not selected (NO in ACT 116), the control section 102 determines whether or not the large sheet printing method is selected by the user (ACT 119). If the large sheet printing method is selected (YES in ACT 119), the control section 102 prints the image with the original image print size on a sheet having a size that is larger than the original image print size and prints the two-dimensional code (s) in the margin of the sheet (ACT 120), and ends the present processing.

If the large sheet printing method is not selected (NO in ACT 119), the control section 102 carries out the normal printing (ACT 121) since none of the other printing methods were selected by the user, and ends the present processing.

The image processing apparatus 100 according to the embodiment prints a two-dimensional code on an output sheet; however, in other examples, the two-dimensional code may instead be displayed on the operation panel 112 without being printed on the output sheet. Furthermore, the image processing apparatus 100 may be configured to cause the two-dimensional code (s) to be displayed on a PC in a case in which the printing is carried out according to a printing instruction from the PC.

In the embodiment described above, a particular printing method (e.g., reduction, large sheet, another sheet) is selected by the user; however, in other examples, the printing method may be automatically determined by the image processing apparatus 100. For example, the printing method may be set to the reduction printing method in a case in which the amount of acquired address information is less than a predetermined number, and the printing method may be set to the large sheet printing method or another sheet printing method in a case in which the amount of the acquired address information is greater than or equal to the predetermined number.

One or more functions of an image processing apparatus according to an embodiment may be realized by a computer. In such a case, a program for realizing these one or more functions may be stored in a computer-readable recording medium and the program may be executed to realize the one or more functions. Furthermore, a "computer system" called herein includes hardware and a peripheral device. Further, the "computer-readable recording medium" refers to a portable medium such as a flexible disk, a magneto-optical disk, a ROM and a CDROM, a storage device such as a hard disk built in the computer system, and the like. Furthermore, the program may be transmitted or otherwise delivered of via a network such as the Internet or a communication line such as a telephone line. While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image printing apparatus, comprising:
a control section configured to:
receive original image data,
analyze the original image data to acquire address information included in the original image data, and
generate a two-dimensional code corresponding to the acquired address information; and
a printer controlled by the control section to print the generated two-dimensional code and the original image data, wherein
the original image data has an original print size corresponding to a predetermined page size, and
the control section generates the image data to include the two-dimensional code and a reduced-size image that is obtained by reducing the original image data below the original print size on a single page having the original print size.

2. The image printing apparatus according to claim 1, wherein the amount the original image data is reduced in obtaining the reduced-size image is set according to the number of generated two-dimensional codes.

3. The image printing apparatus according to claim 1, wherein, in the analysis of the original image data, a character recognition processing is performed on the original image data to acquire the address information.

4. The image printing apparatus according to claim 3, further comprising:
a display to display the address information; and
an input device for a user to edit the address information displayed on the display.

5. The image printing apparatus according to claim 1, further comprising:
a display to display the address information; and
an input device for a user to edit the address information displayed on the display.

6. The image printing apparatus according to claim 1, further comprising:
a scanner configured to scan a document, wherein
the scanner generates the original image data and the control section receives the original image data from the scanner.

7. The image printing apparatus according to claim 1, further comprising:
a communication interface configured to connect to one or more computing devices across a communication network, wherein
the control section receives the original image data from the one or more computing devices via the communication interface.

8. The image printing apparatus according to claim 1, wherein the control section is further configured to:
acquire the original print size of the original image data, and
compare the original print size to a maximum print size of the printer.

9. The image printing apparatus according to claim 1, wherein the address information includes at least one of an electronic mail address or universal resource locator (URL) address.

10. An image printing apparatus, comprising:
a control section configured to:
receive original image data,
analyze the original image data to acquire address information included in the original image data, and
generate a two-dimensional code corresponding to the acquired address information; and a printer controlled by the control section to print the generated two-dimensional code and the original image data, wherein the original image data has an original print size corresponding to a first predetermined page size, and the control section is configured to generate the image data such that original image data prints on a sheet having a second predetermined page size that is larger than the first predetermined page size and the two-dimensional code prints in the margin of the sheet.

11. The image printing apparatus according to claim 10, further comprising:

a display to display the address information; and an input device for a user to edit the address information displayed on the display.

12. The image printing apparatus according to claim 10, wherein the control section is further configured to:

acquire the original print size of the original image data, and compare the original print size to a maximum print size of the printer.

13. An image printing apparatus, comprising:

a scanner configured to scan a document;

a communication interface configured to connect to a computing device across a communication network;

a printer configured to print images according to provided image data;

a control section configured to:

receive original image data from one of the scanner or the computing device, analyze the original image data to acquire address information included in the original image data, generate a two-dimensional code corresponding to the acquired address information, and generate image data for printing by the printer, the image data including the generated two-dimensional code and the original image data, wherein the original image data has an original print size corresponding to a first predetermined page size, and the control section is configured to generate the image data such that original image data prints on a sheet having a second predetermined page size that is larger than the first predetermined page size and the two-dimensional code prints in the margin of the sheet.

14. The image printing apparatus according to claim 13, further comprising:

a display to display the address information; and an input device for a user to edit the address information displayed on the display.

15. The image printing apparatus according to claim 13, wherein the address information includes at least one of an electronic mail address or universal resource locator (URL) address.

16. The image printing apparatus according to claim 13, wherein the control section is further configured to:

acquire the original print size of the original image data, and compare the original print size to a maximum print size of the printer.

17. An image printing apparatus, comprising:

a scanner configured to scan a document;

a communication interface configured to connect to a computing device across a communication network;

a printer configured to print images according to provided image data;

a control section configured to:

receive original image data from one of the scanner or the computing device, analyze the original image data to acquire address information included in the original image data, generate a two-dimensional code corresponding to the acquired address information, and generate image data for printing by the printer, the image data including the generated two-dimensional code and the original image data, wherein the original image data has an original print size corresponding to a predetermined page size, the control section generates the image data to include the two-dimensional code and a reduced-size image that is obtained by reducing the original image data below the original print size, and the printer prints the generated image data on a single page having the original print size.

18. The image printing apparatus according to claim 17, further comprising:

a display to display the address information; and an input device for a user to edit the address information displayed on the display.

19. The image printing apparatus according to claim 17, wherein the address information includes at least one of an electronic mail address or universal resource locator (URL) address.

20. The image printing apparatus according to claim 17, wherein the control section is further configured to:

acquire the original print size of the original image data, and compare the original print size to a maximum print size of the printer.

* * * * *